3,320,280
PROCESS FOR PREPARING α-(3-INDOLYL) LOWER ALIPHATIC ACIDS
George Gal, Summit, and Meyer Sletzinger, Plainfield, N.J., assignors to Merck & Co., Rahway, N.J., a corporation of New Jersey
No Drawing. Filed Apr. 13, 1964, Ser. No. 359,512
6 Claims. (Cl. 260—326.12)

This application is a continuation-in-part of copending application Ser. No. 247,859, filed Dec. 28, 1962, now Patent No. 3,171,841.

This invention relates to a process for preparing α-(3-indolyl)-lower aliphatic acids having an aromatic carboxylic acyl radical of less than three fused rings attached to the nitrogen atom of the indole ring. More particularly it is concerned with the synthesis of intermediate esters of such acids aroylated at the 1-position of the indole nucleus which can be readily converted to the corresponding acids by pyrolysis without affecting the 1-aroyl group.

The α-(3-indolyl)-lower aliphatic acids acylated in the N–1 position of the indole nucleus with aroyl groups such as benzoyl and napthoyl radicals, have been found to be potent anti-inflammatory agents. The preparation of these materials generally involves the acylation of an indolyl acid ester that is unsubstituted in the N–1 position to form an N-acylated indolyl acid ester from which the free acid can be obtained. It has been observed, however, that the N-acyl group is hydrolyzed and, therefore, lost under conditions normally employed for the saponification of the ester to the free acid. For this reason, care must be taken in converting the N-acylated indolyl acid esters to the corresponding free acids. One convenient method of accomplishing this conversion comprises acylation of the tertiary esters of N-unsubstituted indolyl acids, since the resulting tertiary N-acylated indolyl acid esters can be transformed into the free N-acylated indolyl acids by pyrolysis without substantially causing the removal of the N-acyl group.

The subject invention, therefore, provides a simple, convenient method of preparing esters of N-unsubstituted indolyl acids which, after acylation of the N–1 position, can easily be converted to the corresponding free acids by pyrolysis.

It has now been found that the desired pyrolyzable esters of α-(3-indolyl)-lower aliphatic acids can be prepared in a simple one-step method, to wit, by reacting directly, in the absence of an added catalyst, a mixture of the α-(3-indolyl)-lower aliphatic acid and an olefin. Preferred olefins in accordance with the present invention are dihydropyrane and isobutylene. Accordingly, the pyrolyzable esters provided herein are the dihydropyrane and the tertiary-butyl esters of 1-aroyl and 1-heteroaroyl α-(3-indolyl)-lower aliphatic acids.

The 1-aroyl and heteroaroyl indolyl-3-aliphatic acid compounds formed according to the process of this invention have the general structural formula:

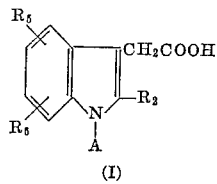

(I)

where:

A is an aromatic carboxylic acyl radical of less than three fused rings;

$R_2$ is hydrogen, lower alkyl, lower alkenyl, cycloalkyl, aryl or aralkyl;

$R_5$ is hydrogen, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperizinyl, 4-morpholinyl, cyano, di(lower alkyl)amino lower alkyl, trifluoromethyl, halogen, di(lower alkyl) sulfamyl, benzylthio, lower alkylbenzylthio, lower alkoxy benzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropylmethyloxy or cyclobutylmethyloxy;

$R_6$ is hydrogen, lower alkyl, lower alkoxy, fluorine or trifluoromethyl.

Typical aryl (Ar) groups which form part of an aroyl radical include benzene, napthene, biphenyl or a substituted benzene, napthene or biphenyl.

Typical heteroaromatic (Het) groups which form part of a heteroaroyl radical include furyl, thienyl, pyrryl, thiazolyl, thiadiazolyl, pyrazinyl, pyridyl, pyrazolyl, imidazolyl, oxazolyl, pyrimidinyl and isoxazolyl rings; and benz derivatives thereof, such as benzimidazolyl, quinolinyl and the like, which may be substituted as in Ar. stituted as in Ar.

In the most preferred compounds of the invention, $R_5$ is lower alkyl, lower alkoxy, halogen or nitro, and $R_2$ is alkyl.

Accordingly, the compounds prepared herein may be illustrated by the following two preferred formulas:

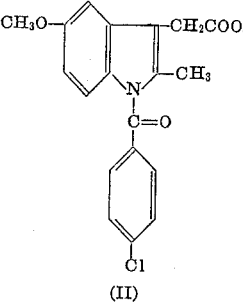 and 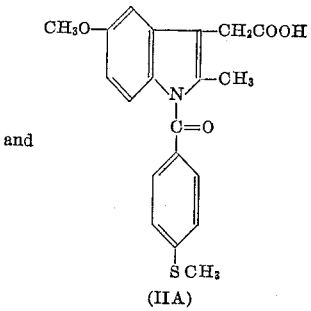

(II)  (IIA)

A critical feature of the new compounds described herein is the presence of an aroyl radical attached to the N–1 position of the indole. These acyl groups may be further substituted in the aromatic ring with hydrocarbon groups or with functional substituents. Thus, suitable aroyl substituents are the benzoyl, phenylbenzoyl and naphthoyl groups. The rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, propoxy, an alkenyloxy such as allyloxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g., benzylthio and phenylthio. The N–1 aroyl radical may, if desired, be haloalkylated, as with a trifluoromethyl, trifluoromethyl, perfluoroethyl, β-chloroethyl, or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazine and the like, or an aldehyde derivative of the type represented by acetals or thioacetals. In the preferred compounds, the N–1 aroyl radical is benzoyl and the functional substituent is in the para position of the six-membered ring.

The following intermediate compounds are representative of those contemplated by this invention and which may be prepared by the procedure discussed hereinbelow:

The tertiary butyl and the tetrahydropyranyl esters of α-(1-p-chlorobenzoyl-2-methyl-5 - methoxy - 3 - indolyl)-acetic acid, α-(1-p-chlorobenzoyl-2,5-dimethyl-3-indolyl)-acetic acid, α-(1-p-methylthiobenzoyl-2 - methyl - 5 - methoxy-3-indolyl)-acetic acid, α-(1-p-chlorobenzoyl-2-ethyl-5-methoxy-3-indolyl)-acetic acid, α-(1-p-chlorobenzoyl-2-propyl-5-methoxy-3-indolyl)-acetic acid, α-(1 - benzoyl-2-methyl-5-methoxy-3-indolyl)-acetic acid, α-[1-(2,4 - dichlorobenzoyl)-2-methyl-5-methoxy - 3 - indolyl] - acetic acid, α-[1-(2-thienoyl)-2-methyl-5-methoxy - 3 - indolyl]-acetic acid, [1-(4′-thiazolyl)-2-ethyl-5-methyl-3-indolyl]-acetic acid, α-[1-(2′-furoyl)-2,5-dimethyl-3-indolyl]-acetic acid, α-[1-(nicotinoyl)-2-methyl - 5 - methoxy - 3 - indolyl]-acetic acid, α-[1-(naphthoyl)-2-methyl-5-methoxy-3-indolyl]-acetic acid, α-[1-(4′-thiazolyl)-2-methyl-5-methoxy-3-indolyl]-acetic acid, and the like.

The α-(1-aroyl or heteroaroyl-3-indolyl)-lower aliphatic acids and derivative compounds of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic and analgesic activity. For these purposes, they are normally administered orally in tablets or capsules, the optimum dosage depending, of course, on the particular compound being used and the type and severity of infection being tretaed. Although the optimum quantities of these compounds of this nivention to be used in such manner will depend on the compound employed and the particular type of disease condition treated, oral dose levels of preferred compounds in the range of 10–2000 mg. per day are useful in control or arthritic conditions, depending on the activity of the specific compound and the reaction sensitivity of the patient. These compounds also may be included in combination with pharmaceutically acceptable carriers, as will be apparent to those skilled in the art.

The process of the present invention may be further defined with reference to the following flow sheet:

FLOW SHEET

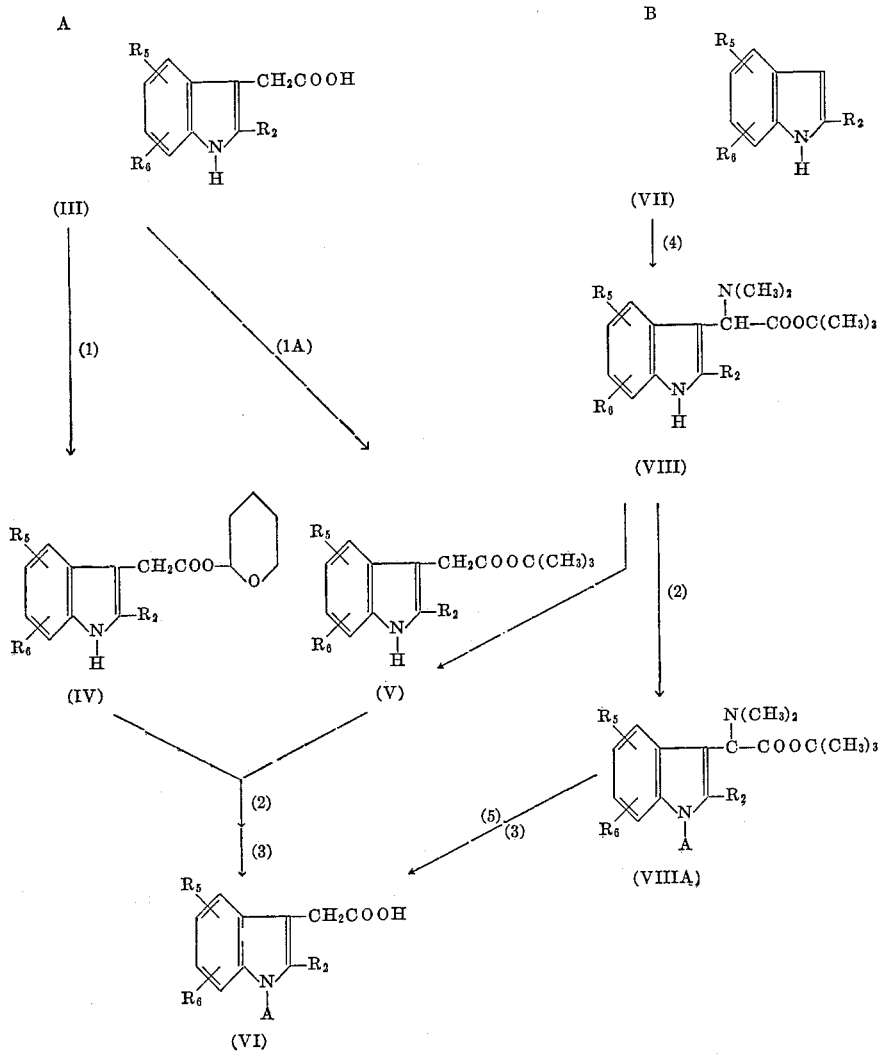

Flow sheet A

Steps (1) and (1A):

*Esterification.*—Formation of a pyrolyzable ester of an indole-3-carboxylic acid by direct reaction between the acid and an unsaturated hydrocarbon; specifically with dihydropyrane (1) or isobutylene (1A).

*Conditions.*—Generally in a solvent at room temperature.

*Equivalents.*—$R_2$, $R_5$ and $R_6$ as defined in the specification.

(2) *Aroylation.*—See specification.

(3) *Pyrolysis.*—See specification.

Flow sheet B

Step (4): *Side chain formation.*—Condensation of an indole with an amine and a glyoxyl ester to form an α-amino-indole-3-carboxylate ester.

(5) *Hydrogenation.*—Removal of α-amino group by reaction with hydrogen to form a pyrolyzable ester.

(2) *Aroylation.*—As in (A2).

(3) *Pyrolysis.*—As in (A3).

As is shown in flow sheet A, the first step in the sequence is the direct formation of the pyrolyzable ester by reaction of an α-(3-indolyl)-acetic acid (III) with dihydropyrane (step (1)) or isobutylene (step (1A)) to form the dihydropyrane ester (IV) or the tertiary butyl ester (V) of the α-(3-indolyl)-acetic acid. The esterification is advantageously carried out in an inert solvent at room temperature. The reaction of dihydropyrane preferably is performed in an inert solvent while the esterification with isobutylene is carried out in the presence of a small amount of a strong acid, such as sulfuric acid.

The acylation reaction (step 2) is preferably conducted by treating the α-(3-indolyl)-lower aliphatic ester material with an alkali metal hydride, such as sodium hydride, to form e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is also preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. This latter is prepared by mixing the acylating acid and p-nitrophenol in tetrahydrofurane and adding dicyclohexyl carbodiimide in tetrahydrofurane slowly. The dicyclohexylurea which forms is removed by filtration and the nitrophenylester is recovered from the filtrate. Alternatively, there can also be used the anhydride, azide or thiophenolic ester of the acylating acid. Whichever is used, the acylation of the α-(3-indolyl)-lower aliphatic ester material is achieved by forming a sodium salt of said material with sodium hydride in an anhydrous solvent and adding the nitrophenylester.

The next step in the process sequence (step (3)) involves the conversion of the aroylated ester to the aroylated acid (VI). This conversion is effected by pyrolysis of the ester. This method enables a selective removal of the ester group without affecting the 1-aroyl substituent. Generally the ester is heated to above 210° C. in the absence of a catalyst. Preferably however, it is converted by heating to between 25–110° C. in the presence of a catalytic amount of an aryl sulfonic acid, such as toluene sulfonic acid, or another strong acid.

An alternative route to the formation of the t-butyl ester intermediate (V) is shown in sequence B of the flow sheet. In this embodiment of the invention, an indole (VII), unsubstituted at the 3-position, is condensed in a Mannich reaction with an dialkylamine and the t-butyl ester of glyoxalic acid to form a side chain having a dialkyl amino group in the α-position of the indole side chain (step (4)). The dialkylamino group then is removed by direct hydrogenation according to step (5), to form the t-butyl ester intermediate (V), which is then treated as in A sequence described above to provide the desired acid (VI).

The indolyl aliphatic acid compounds employed as starting material in the reaction discussed above, and having the formula:

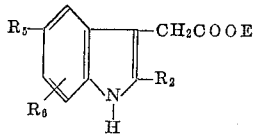

where $R_2$, $R_5$ and $R_6$ have the previously defined meanings and E is a hydrocarbonoxy radical having less than nine carbon atoms or —$NH_2$, may be synthesized in various ways. When $R_2$ is hydrogen or methyl, it is preferred to form such compounds by reacting together an appropriately substituted phenylhydrazine and a substituted levulinic ester or amide to form an intermediate phenylhydrazine which cyclizes under the reaction conditions to the indole compound

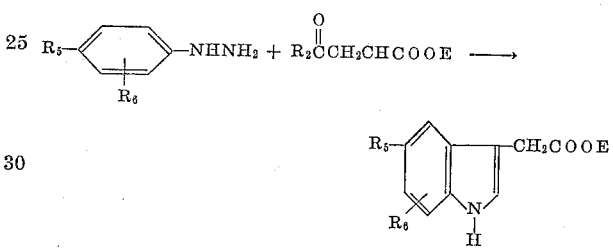

where $R_4$, $R_5$ and E are as above, and $R_2$ is hydrogen or methyl. The reaction is normally carried out in a lower alkanol such as methanol, ethanol, isopropanol or butanol containing an acid such as hydrochloric, hydrobromic, sulfuric or acetic acid or in aqueous mineral acid such as concentrated hydrochloric, hydrobromic, sulfuric or acetic acid, or other Lewis acid such as $ZnCl_2$, $BF_3$, $SnCl_4$ and the like. The acid serves as a catalyst in the condensation and ring closure reactions leading to the 1-unsubstituted indole. When the substituted levulinic esters are used, the nature of the ester is not critical, although it is preferred to utilize a lower alkyl ester, e.g., the methyl, ethyl, propyl, isobutyl or isopropyl compound. To avoid the possibility of transesterification the alcohol used as the solvent medium is preferably the same as the alcohol moiety of the ester. When $R_2$ is hydrogen, it is convenient to employ the aldehyde in the form of an acetal, e.g., methyl γ,γ-dimethoxy butyrate. An acid addition salt of the phenylhydrazine reactant, for example the hydrochloride, is normally preferred over the free base for practical reasons, although such salts and the base are equivalent in the reaction itself.

Formation of the α-(3-indolyl)-aliphatic acid, or ester thereof, is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the 1-unsubstituted esters are low melting solids, they are conveniently purified by distillation under reduced pressure. They are saponified by treatment with an alkali metal hydroxide.

The substituted phenylhydrazines employed as one of the starting materials in this synthesis are prepared by known methods. One convenient method is by diazotization of the appropriately substituted aniline to give the diazo compound, treatment of the latter with stannous chloride to form a tin complex, and decomposition of this complex to the phenylhydrazine with sodium hydroxide.

Alternatively, it is possible to first produce an indole of the formula:

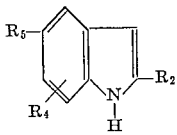

where $R_2$, $R_4$ and $R_5$ have the same meaning as before, and then to introduce the carboxylic acid residue at the 3-position. This is accomplished by treating the indole of the above formula under Mannich reaction conditions with formaldehydedialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_2$ is an alkyl radical other than methyl, such as the 2-ethyl, 2-propyl, 2-allyl and like substances. Compounds of the above formula, unsubstituted in the 3-position, are readily prepared following the procedures set forth in columns 2 and 3 of U.S. Patent No. 2,825,734. Products where $R_5$ is acyloxy, halo, cyano, carboxy, carbalkoxy, alkyl, aryl, aralkyl, nitro or hydrocarbonoxy are prepared via the synthesis beginning from a substituted 2-nitro benzaldehyde or 2-nitrotoluene.

The synthesis of various compounds of this invention having on the indole ring system a 5-substituent which has a nitrogen attached to the homocyclic ring of the indole is generally based on the 5-nitro compound. This is transformed into the desired 5-substituent. Such transformation may be before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides gives mono and dialkyl amino groups. If the alkyl halide is a dihaloalkylene group (e.g., 1,4-dibromobutane) a heterocyclic ring (e.g., pyrrolidino) is formed. Similarly, bis($\beta$-chloroethyl) ether will give an N-morpholino compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

The following examples will more specifically illustrate the present invention.

EXAMPLE 1

*1-p-chloro benzoyl-2-methyl-5-methoxy-indole-3-acetic acid*

Step 1: *t - Butyl - 2 - methyl - 5 - methoxy - indole - 3 - acetic acid.*—Into a one liter three-necked flask 400 ml. of methylene chloride, 22.0 g. of 2-methyl-5-methoxy-indole-3-acetic acid and 1.0 g. of concentrated sulfuric acid were charged. In a slow stream 47–50 g. of isobutylene was introduced at 10° C. and the reaction mixture was stirred for 70 hours at 10–20° C. The unreacted starting material is filtered off (6.1 g.) and the filtrate is poured into 150 ml. of cold water containing 4.0 g. of sodium carbonate. The organic layer is separated, washed with sodium carbonate solution, then with water, and finally dried over MgSO$_4$. The solvent is removed in vacuo and the residual oil is dissolved in hot cyclohexane, which crystallizes rapidly. After 30 minutes aging period at 15° C., the product is filtered off, washed with cyclohexane and dried in vacuo.

3.8 of the crude t-butyl ester prepared above is added to 12 ml. of dry ethylacetate at 10° C. and stirred for 10 minutes. The insoluble material is filtered off and washed with 1.0 ml. of cold ethylacetate. Ethylacetate solution is concentrated in vacuo and the residue recrystallized from cyclohexane:ethylacetate (9:1). Yield: 2.31 g. t-butyl-2-methyl-5-methoxy-indole-3-acetate, M.P. 106–110° C.

Step (2): A stirred solution of ester (18 g., 0.065 mole) in dry DMF (450 ml.) is cooled to 4° in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 l. of 5% acetic acid, extracted with a mixture of ether and benzene, washed thoroughly with water, bicarbonate, saturated salt, dried over magnesium sulfate, treated with charcoal, and evaporated to a residue which partly crystallizes. This is shaken with ether, filtered, and the filtrate is evaporated to a residue (17 g.) which solidifies after being refrigerated overnight. The crude product is boiled with 300 ml. of Skellysolve B, cooled to room temperature, decanted from some gummy material, treated with charcoal, concentrated to 100 ml., and allowed to crystallize. The product thus obtained (10 g.) is recrystallized from 50 ml. of methanol and gives 4.5 g. of analytically pure material, M.P. 103–4°.

Step (3): To a solution of 500 mg. p-toluene-sulfuric acid in 80 ml. of benzene is added 10 g. of the above prepared acylated ester. The mixture is heated under reflux for 1 hour (during this period, 600 ml. of isobutylene is formed).

The reaction mixture then is cooled to 60–65° C. and washed once with 25 ml. of water containing 1.0 g. of sodium acetate and twice with 25 ml. of water. The warm benzene solution then is dried over sodium sulfate, dechlorized by addition of 1.0 g. charcoal, filtered while hot and concentrated to a volume of 30 ml. The yellow-colored solution is cooled to 10° C. and aged for two hours. The crude product is filtered and recrystallized from t-butanol and dried in vacuo at 80° C. (7.0 g., 81%); M.P. 153–154° C.

EXAMPLE 2

The procedure of Example 1 is followed using equivalent quantities of the following starting materials in place of α-(2methyl-5-methoxy-3-indolyl)-acetic acid;
α-(2-ethyl-5-methyl-3-indolyl)-acetic acid;
α-(2-methyl-5-trifluoromethyl-3-indolyl)-acetic acid;
α-(2-butyl-5-benzyloxy-3-indolyl)-acetic acid;
α-(2-phenyl-5-methoxy-3-indolyl)-acetic acid;
α-(2-p-methoxy-phenyl-5-chloro-3-indolyl)-acetic acid;
α-(2-methyl-5-fluoro-3-indolyl)-acetic acid;
α-(2-cyclopropylmethyl-5-methyl-3-indolyl)-acetic acid;
α-(2-p-chloro-phenyl-5-methoxy-3-indolyl)-acetic acid;
α-(5-methoxy-3-indolyl)-acetic acid;
α-(5-benzyloxy-3-indolyl)-acetic acid;
α-(2-methyl-5-butyloxy-3-indolyl)-acetic acid;
α-(5-ethoxy-3-indolyl)-acetic acid;
α-(2-benzyl-5-methoxy-3-indolyl)-acetic acid;
t-butyl-α-(5-benzyloxy-6-methyl-3-indolyl)-acetate;
propyl-α-(6-methoxy-3-indolyl)-acetate;
methyl-α-(2-methyl-5-nitro-6-fluoro-3-indolyl)-acetate;
α-(5-benzyloxy-6-trifluoromethyl-3-indolyl)-acetic acid;
α-(2-methyl-5-nitro-3-indolyl)-acetic acid;
α-(2-methyl-5-acetyl-3-indolyl)-acetic acid;
α-(2-methyl-5-butyryl-3-indolyl)-acetic acid;
α-(2-methyl-5-bis(benzyloxyethyl)amino-3-indolyl)-acetic acid;

α-(2-methyl-5-bis(benzyloxybutyl)amino-3-indolyl)-acetic acid;
α-(2-methyl-5-bis(benzyloxypentyl) amino-3-indolyl)-acetic acid;
α-(2-methyl-5-(1-pyrrolidino)-3-indolyl)-acetic acid;
α-(2-methyl-5-(4-methyl-1-piperazinyl)-3-indolyl)-acetic acid;
α-(2-methyl-5-(4-morpholinyl)-3-indolyl)-acetic acid;
α-(2-methyl-5-trifluoromethyl-3-indolyl)-acetic acid;
α-(2-methyl-5-trifluoromethyl-3-indolyl)-acetic acid;
α-(2-methyl-5-chloro-3-indolyl)-acetic acid;
α-(2-methyl-5-bromo-3-indolyl)-acetic acid;
α-(2-methyl-5-fluoro-3-indolyl)-acetic acid;
α-(2-methyl-5-dimethylsulfamyl-3-indolyl)-acetic acid;
α-(2-methyl-5-dipropylsulfamyl-3-indolyl)-acetic acid;
α-(2-methyl-5-benzylthio-3-indolyl)-acetic acid;
α-(2-methyl-5-p-methylbenzylthio-3-indolyl)-acetic acid;
α-(2-methyl-5-p-propylbenzylthio-3-indolyl)-acetic acid;
α-(2-methyl-5-p-pentyl-benzylthio-3-indolyl)-acetic acid;
α-(2-methyl-5-p-methoxybenzylthio-3-indolyl-acetic acid;
α-(2-methyl-5-p-propoxybenzylthio-3-indolyl)-acetic acid;
α-(2-methyl-5-p-pentoxybenzylthio-3-indolyl)-acetic acid;
α-(2-methyl-5-p-chlorobenzylthio-3-indolyl)-acetic acid;
α-(2-methyl-5-p-bromobenzylthio-3-indolyl)-acetic acid;
α-(2-methyl-5-p-fluorobenzylthio-3-indolyl)-acetic acid;
α-(2-methyl-5-benzyloxy-3-indolyl)-acetic acid;
α-(2-methyl-5-p-methylbenzyloxy-3-indolyl)-acetic acid;
α-(2-methyl-5-p-propylbenzyloxy-3-indolyl)-acetic acid;
α-(2-methyl-5-p-pentylbenzyloxy-3-indolyl)-acetic acid;
α-(2-methyl-5-p-methoxybenzyloxy-3-indolyl)-acetic acid;
α-(2-methyl-5-p-propoxybenzyloxy-3-indolyl)-acetic acid;
α-(2-methyl-5-p-pentyloxybenzyloxy-3-indolyl)-acetic acid;
α-(2-methyl-5-p-chlorobenzyloxy-3-indolyl)-acetic acid;
α-(2-methyl-5-bromobenzyloxy-3-indolyl)-acetic acid;
α-(2-methyl-5-p-fluorobenzyloxy-3-indolyl)-acetic acid;
α-(2-methyl-5-cyclopropylmethoxy-3-indolyl)-acetic acid;
α-(2-methyl-5-cyclopropylpropoxy-3-indolyl)-acetic acid;
α-(2-methyl-5-methyloxy-3-indolyl)-acetic acid;
α-(2-methyl-5-cyclobutylmethoxymethyloxy-3-indolyl)-acetic acid;
α-(2-methyl-5-cyclobutylpropoxymethyloxy-3-indolyl)-acetic acid;
α-(2-methyl-5-cyclobutylpentoxymethyloxy-3-indolyl)-acetic acid;
α-(2-methyl-5-N,N-dimethylcarbamyl-3-indolyl)-acetic acid;
and α-(2-methyl-5-butyl-3-indolyl)-acetic acid, to produce the corresponding substituted final products.

EXAMPLE 3

The procedure of Example 1B is followed using equivalent quantities of the following aroyl and heteroaroyl chlorides in place of p-methylthiobenzoyl chloride:

p-chlorobenzoyl chloride,
3,3,5-trimethoxybenzoyl chloride,
p-phenoxybenzoyl chloride,
p-trifluoroacetylbenzoyl chloride,
p-N,N-dimethylsulfamylbenzoyl chloride,
3-furoyl chloride,
1-methylimidazol-5-carboxylic acid chloride,
1,3-dimethyl-2,3-dihydro-2-oxoimidazole-4-carboxylic acid chloride,
1-methylbenzimidazol-2-carboxy chloride,
5-fluoro-2-thienoyl chloride,
3-thenoyl chloride,
5-nitro-2-furoyl chloride,
1-methyl-indazole-3-carboxy chloride,
1-methyl-6-nitroindazole-3-carboxy chloride,
oxazole-4-carboxy chloride,
benzoxazole-2-carboxy chloride,
thiazole-4-carboxy chloride,
thiazole-2-carboxy chloride,
2-phenylthiazole-4-carboxy chloride,
2-benzylmercaptothiazole-4-carboxy chloride,
p-acetylbenzoyl chloride,
N,N-dimethyl-p-carboxamidebenzoyl chloride,
p-cyanobenzoyl chloride,
p-carbomethoxy benzoyl chloride,
p-formylbenzoyl chloride,
p-trifluoromethyl-thiobenzoyl chloride,
N,N-dimethyl-p-sulfonamidobenzoyl chloride,
p-methylsulfinylbenzoyl chloride,
p-methylsulfonylbenzoyl chloride,
p-benzylthiobenzoyl chloride,
p-mercaptobenzoyl chloride,
p-nitrobenzoyl chloride,
p-dimethylaminobenzoyl chloride,
p-acetaminobenzoyl chloride,
o-fluoro-p-chlorobenzoyl chloride,
o-methoxy-p-chlorobenzoyl chloride,
o-hydroxy-p-chlorobenzoyl chloride, and
2,4,5-trichlorobenzoyl chloride, to produce the corresponding N–1 aroyl and N–1 heteroaroyl derivatives of α-(2-methyl-5-methoxy-3-indolyl)-acetic acid.

EXAMPLE 4

*1-p-chlorobenzoyl-2-methyl-5-methoxy-indole-3-acetic acid*

(1) *Tetrahydropyranyl-2-methyl - 5 - methoxy - indole-3-acetate.*—To a slurry of 2-methyl-5-methoxy-indole-3-acetic acid (11.0 g.) in 50 ml. of benzene stirred at 20–25° C. and 6.3 g. dihydropyrane is added dropwise over 15 minutes. The mixture is aged at 35–40° C. for 4 hours. Most of the solid dissolves at this time, and the remaining unreacted acid is filtered from the reaction mixture (930 mg.). Pyridine (0.5 ml.) and ether (20 ml.) are added to the filtrate, then extracted with sodium bicarbonate solution and finally with water. After drying, the solvent is removed in vacuo, and the residue (15.7 g.) is used directly for the next step. The infrared spectrum is consistent with the structure of the desired compound. NH at 2.90, 2.95μ; COOR at 5.80μ; unsaturated ring frequencies at 6.1, 6.24μ.

(2) *Tetrahydropyranyl-1-p-chlorobenzoyl - 2 - methyl-5-methoxy-indole-3-acetate.*—The above ester is converted to the 1-p-chlorobenzoyl derivative of 2-methyl-5-methoxy-indole-3-acetic acid by the acylation step (2) of Example 1.

(3) 4.4 g. of tetrahydropyranyl-2-methyl-5-methoxy-indole-3-acetate is dissolved in 25 ml. of ethanol and 250 mg. of p-toluene sulfonic acid. The mixture is allowed to stand at room temperature for 10 hours. Then the precipitate which is formed therein is collected. After recrystallization from t-butanol, and drying in vacuo at 80°, 3.1 g. of the desired product is obtained; M.P. 159–160° C.

EXAMPLE 5

*1-p-chlorobenzoyl-2-methyl-5-methoxy-indole-3-acetic acid*

(1) *t-Butyl - 2 - methyl - 5 - methoxy-indole - 3 - (α-dimethylamino)-acetate.*—Acetic acid (15 ml.) is added to 9 g. of an aqueous solution (50%) of dimethylamine. The mixture is cooled to 10° C. and 13.0 g. of t-butylglyoxalate and 16.1 g. of 2-methyl-5-methoxy-indole are added. The reaction is exothermic and the indole goes in the solution. After a 3-hour aging period, 4 N sodium hydroxide solution is added to neutralize the acid. The crystallized product is filtered off, washed with water and dried in vacuo.

(2) To a slurry of 6.0 g. of 50% sodium hydride in 100 ml. benzene is added a solution of 31.8 g. t-butyl-2-methyl-5-methoxy-indole-3-(α-dimethylamino)-acetate in 120 ml. of benzene at 80° C. The reaction is heated at 80° C. until the theoretical amount of hydrogen is formed and then cooled at 10° C.

18.1 g. of p-chlorobenzoylchloride in 20 ml. of benzene then is added dropwise at 10° C. to 15° C. After a 1-hour aging period, 10 ml. of acetic acid is added carefully to decompose the excess of the sodium hydride. The inorganic salts are filtered off and the filtrate is concentrated to 50 ml. The oily residue is dissolved in 200 ml. of hot cyclohexane and the solution is cooled to 10° C. The crystalline product is filtered off, washed with cold cyclohexane and dried in vacuo.

(3) 4.56 g. of t-butyl-1-p-chlorobenzoyl-2-methyl-5-methoxy-indole-3-(α-dimethylamino)-acetate in 25 ml. of dioxane is hydrogenated in the presence of 1.0 g. palladium on charcoal catalyst. After the theoretical amount of hydrogen is absorbed, the catalyst is filtered off and the solvent is removed in vacuo. The oily residue is recrystallized from cyclohexane.

3.1 g. of t-butyl-1-p-chlorobenzoyl-2-methyl-5-methoxy-indole-3-acetate (M.P. 105° C.) is obtained. This product is then converted to the corresponding acid by acid catalyzed pyrolysis as in Example 1C.

EXAMPLE 6

The procedure of Example 2 is followed using the substituted indole starting compounds to produce the corresponding tetrahydropyranyl esters of the substituted 3-indole acetates.

EXAMPLE 7

The procedures of Examples 3 and 4 are followed to produce the corresponding 1-aroyl-3-indole acetic acids as produced in these acetic acids.

EXAMPLE 8

*Preparation of t-butyl-2-methyl-5-methoxy-indole-3-(α-dimethylamino)-acetate*

Acetic acid (15 ml.) is added to 9 g. of an aqueous solution (50%) of dimethylamine. The mixture is cooled to 10° C. and 13.0 g. of t-butylglyoxalate and 16.1 g. of 2-methyl-5-methoxy-indole are added. The reaction is exothermic and the indole goes into the solution. After a 3-hour aging period, 4 N sodium hydroxide solution is added to neutralize the acid. The crystallized product is filtered off, washed with water and dried in vacuo.

What is claimed is:

1. A process of making a compound having the formula:

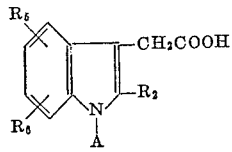

wherein:

A is selected from the group consisting of benzoyl, biphenoyl, naphthoyl, and

wherein Het is selected from the group consisting of furyl, thienyl, pyrryl, thiazolyl, thiadiazolyl, pyrazinyl, pyridyl, pyrazolyl, imidazolyl, oxazolyl, pyrimidinyl and isoxazolyl and substituted benzoyl, biphenoyl, naphthoyl and

wherein said substituent is selected from the group consisting of lower alkylthio, lower alkoxy, phenoxy, dilower alkylsulfamyl, trifluoromethylthio, lower alkanoyl, carbomethoxy, halo, cyano, benzylthio, nitro, mercapto, lower alkylsulfonyl, lower alkylsulfinyl, dilower alkylamino and hydroxy;

$R_2$ is selected from the group consisting of hydrogen, lower alkyl, lower alkenyl, phenyl, phenyl(lower alkyl), chlorophenyl and methoxy phenyl;

$R_5$ is hydrogen, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperazinyl, 4-morpholinyl, cyano, di(lower alkyl)amino lower alkyl, trifluoromethyl, halogen, di(lower alkyl)sulfamyl, benzylthio, lower alkylbenzylthio, lower alkoxy benzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropylmethyloxy or cyclobutylmethyloxy;

$R_6$ is hydrogen, alkyl, lower alkyl, fluorine or trifluoromethyl;

which comprises the steps of:

(a) condensing a compound having the formula:

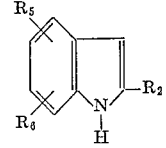

in which $R_2$, $R_5$ and $R_6$ are as defined above, with a dialkylamine and the t-butyl ester of the glyoxalate acid to form the tertiary butyl ester of the corresponding indole-3-acetic acid having a dialkylamine group in the α-position of the acetic acid side chain;

(b) hydrogenating in a non-acidic medium said intermediate to remove the α-dialkylamino group;

(c) intimately contacting in an inert solvent a reagent selected from the group consisting of an A-halide and an A-ester of p-nitrophenol, with the N-alkali metal salt of the intermediate compound prepared in (a); and (d) pyrolyzing the arylated ester produced in (b) to form the desired compound.

2. The method in accordance with claim 1 wherein said dialkylamine is dimethylamine.

3. The method in accordance with claim 2 wherein $R_2$ is methyl, $R_5$ is methoxy, $R_6$ is hydrogen and A is p-chlorobenzoyl.

4. The method in accordance with claim 2 wherein A is p-methylthiobenzoyl.

5. A process of making a compound having the formula:

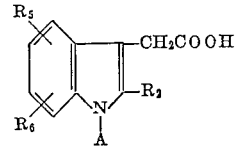

wherein:

A is selected from the group consisting of benzoyl, biphenoyl, naphthoyl, and

wherein Het is selected from the group consisting of furyl, thienyl, pyrryl, thiazolyl, thiadiazolyl, pyrazinyl, pyridyl, pyrazolyl, imidazolyl, oxazolyl, pyrimidinyl and isoxazolyl and substituted benzoyl, biphenoyl, naphthoyl and

wherein said substituent is selected from the group consisting of lower alkylthio, lower alkoxy, phenoxy, dilower alkylsulfamyl, trifluoromethylthio, lower alkanoyl, carbomethoxy, halo, cyano, benzylthio, nitro, mercapto, lower alkylsulfonyl, lower alkylsulfinyl, dilower alkylamino and hydroxy;

$R_2$ is selected from the group consisting of hydrogen, lower alkyl, lower alkenyl, phenyl, phenyl(lower alkyl), chlorophenyl and methoxy phenyl;

$R_5$ is hydrogen, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperazinyl, 4-morpholinyl, cyano, di(lower alkyl)amino lower alkyl, trifluoromethyl, halogen, di(lower alkyl)sulfamyl, benzylthio, lower alkylbenzylthio, lower alkoxy benzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropylmethyloxy or cyclobutylmethyloxy;

$R_6$ is hydrogen, alkyl, lower alkyl, fluorine or trifluoromethyl;

which comprises the steps of:

(a) condensing a compound having the formula:

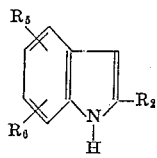

in which $R_2$, $R_5$ and $R_6$ are as defined above, with a dialkylamine and the t-butyl ester of the glyoxalate acid to form the tertiary butyl ester of the corresponding indole-3-acetic acid having a dialkylamine group in the α-position of the acetic acid side chain;

(b) intimately contacting in an inert solvent a reagent selected from the group consisting of an A-halide and an A-ester of p-nitrophenol, with the N-alkali metal salt of the intermediate compound prepared in (a); and (c) hydrogenating in a non-acidic medium said intermediate to remove the α-dialkylamino group; and (d) pyrolyzing the arylated ester produced in (b) to form the desired compound.

6. The method in accordance with claim 5 wherein $R_2$ is methyl, $R_5$ is methoxy, $R_6$ is hydrogen and A is p-chlorobenzoyl.

References Cited by the Examiner

UNITED STATES PATENTS 2,852,531  9/1958  Hoffman _____ 260—345.8
3,074,942  1/1963  Johl et al. _____ 260—319

OTHER REFERENCES

Altschul: Jour. Amer. Chem. Soc., vol. 68, 1946, pp. 2605–2609.

Bruce et al.: Jour. Chem. Soc., 1957, pp. 4789–4798.

Keil et al.: Chemical Abstracts, vol. 54, September 1960, par. 18616h–18617b.

Keil et al.: Chemical Abstracts, vol. 58, February 1963, p. 2586C–E.

Turek: Dissertation Abstracts, vol. 19, 1958, page 48.

ALEX MAZEL, *Primary Examiner.*

HENRY R. JILES, *Examiner.*

MARY U. O'BRIEN, *Assistant Examiner.*